United States Patent
Ajisaka (10) Patent No.: US 9,688,314 B2
(45) Date of Patent: Jun. 27, 2017

(54) VEHICLE FLOOR LOWER STRUCTURE

(71) Applicant: TOYOTA JIDOSHA KABUSHIKI KAISHA, Toyota-shi, Aichi-ken (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/246,896

(22) Filed: Aug. 25, 2016

(65) Prior Publication Data

US 2017/0106916 A1 Apr. 20, 2017

(30) Foreign Application Priority Data

Oct. 20, 2015 (JP) ................................ 2015-206560

(51) Int. Cl.
| | |
|---|---|
| *B60K 15/063* | (2006.01) |
| *B62D 25/20* | (2006.01) |
| *B60K 13/04* | (2006.01) |
| *B60K 15/073* | (2006.01) |

(52) U.S. Cl.
CPC .............. *B62D 25/20* (2013.01); *B60K 13/04* (2013.01); *B60K 15/073* (2013.01); *B62D 25/2036* (2013.01)

(58) Field of Classification Search
CPC  B62D 21/16; B60K 15/07; B60K 2015/0631; B60K 2015/0634
USPC ...................................................... 180/69.4
See application file for complete search history.

(56) References Cited

U.S. PATENT DOCUMENTS

| | | | | |
|---|---|---|---|---|
| 5,702,125 A | * | 12/1997 | Nakajima | ........ B60K 15/03504 280/834 |
| 6,105,708 A | * | 8/2000 | Amano | ............ B60K 15/03504 180/309 |
| 7,237,644 B2 | * | 7/2007 | Matsumoto | ............ B60K 13/04 180/309 |
| 7,331,611 B2 | * | 2/2008 | Kusu | ...................... B60K 13/04 180/309 |
| 7,383,912 B2 | * | 6/2008 | Kondo | ................... B60K 15/06 180/296 |
| 7,438,058 B2 | * | 10/2008 | Ito | ...................... F02M 25/0872 123/518 |
| 8,225,899 B2 | * | 7/2012 | Mabuchi | ................ B60K 13/04 180/296 |
| 8,522,910 B2 | * | 9/2013 | Asai | ...................... B60K 13/04 180/309 |

(Continued)

FOREIGN PATENT DOCUMENTS

| | | |
|---|---|---|
| JP | 2000-085382 A | 3/2000 |
| JP | 2006-051938 A | 2/2006 |

(Continued)

*Primary Examiner* — Jeffrey J Restifo (74) *Attorney, Agent, or Firm* — Oliff PLC (57) ABSTRACT

A vehicle floor lower structure comprises a floor panel that configures a floor of a vehicle; a fuel tank that is disposed at a vehicle body lower side of the floor panel; an exhaust pipe that extends from an engine toward a vehicle body rear side, and that passes at a vehicle width direction outer side of the fuel tank; and a left and right pair of under reinforcements that are joined to a lower face of the floor panel and that respectively extend along a vehicle body front-rear direction at vehicle width direction outer sides of the fuel tank and the exhaust pipe.

4 Claims, 8 Drawing Sheets (56) References Cited

U.S. PATENT DOCUMENTS

| | | | | |
|---|---|---|---|---|
| 8,978,617 | B2* | 3/2015 | Matsuda | F02B 77/00 |
| | | | | 123/198 E |
| 9,133,797 | B2* | 9/2015 | Shomura | F02M 25/0854 |
| 9,499,205 | B1* | 11/2016 | Shimada | B62D 21/15 |
| 2004/0099465 | A1* | 5/2004 | Matsumoto | B60K 13/04 |
| | | | | 180/309 |
| 2005/0211496 | A1* | 9/2005 | Ito | B62D 21/10 |
| | | | | 180/314 |
| 2007/0240926 | A1* | 10/2007 | Chae | B60K 13/04 |
| | | | | 180/309 |
| 2011/0139534 | A1* | 6/2011 | Klimek | B60K 1/04 |
| | | | | 180/309 |
| 2011/0168468 | A1* | 7/2011 | Taguchi | B60K 1/02 |
| | | | | 180/65.245 |
| 2013/0008735 | A1* | 1/2013 | Hiramatsu | B60K 17/16 |
| | | | | 180/291 |
| 2013/0160745 | A1* | 6/2013 | Kawaguchi | F02D 19/0663 |
| | | | | 123/515 |
| 2016/0200191 | A1* | 7/2016 | Ito | B60K 15/073 |
| | | | | 280/834 |

FOREIGN PATENT DOCUMENTS

| | | |
|---|---|---|
| JP | 2006-051942 A | 2/2006 |
| JP | 2006-056510 A | 3/2006 |

* cited by examiner

VEHICLE FLOOR LOWER STRUCTURE

CROSS-REFERENCE TO RELATED APPLICATION

This application is claims priority under 35 USC 119 from Japanese Patent Application, No. 2015-206560 filed Oct. 20, 2015, the disclosure of which is incorporated by reference herein in its entirely.

BACKGROUND

Technical Field

Preferred embodiments relate to a vehicle floor lower structure.

Related Art

Placement structures of vehicle fuels tanks are conventionally known with a configuration in which the fuel tank is disposed at the lower side of a floor panel, and the floor panel is reinforced by a floor frame disposed at a front side, rear side, left side, and right side of the fuel tank (see, for example, Japanese Patent Application Laid-Open (JP-A) No. 2000-85382).

SUMMARY

However, there is still room for improvement with respect to structures that reinforce a floor (floor panel) of the vehicle in order to reduce input of collision load to a fuel tank and an exhaust pipe during a front-end collision (including during offset collisions and so on), or during a side-on collision of the vehicle.

The preferred embodiments obtain a vehicle floor lower structure capable of reducing input of collision load to a fuel tank and an exhaust pipe during a front-end collision or during a side-on collision of the vehicle.

A vehicle floor lower structure of a first aspect of the present disclosure includes a floor panel that configures a floor of a vehicle, a fuel tank that is disposed at a vehicle body lower side of the floor panel, an exhaust pipe that extends from an engine toward a vehicle body rear side and that passes at a vehicle width direction outer side of the fuel tank, and a left and right pair of under reinforcements that are joined to a lower face of the floor panel and that respectively extend along a vehicle body front-rear direction at vehicle width direction outer sides of the fuel tank and the exhaust pipe.

In the first aspect, the left and right pair of under reinforcements that extend along the vehicle body front-rear direction are joined to the lower face of the floor panel, and the fuel tank and the exhaust pipe are disposed at the vehicle width direction inner sides of the under reinforcements. Thus, collision load is suppressed by the under reinforcements from being input to the fuel tank and the exhaust pipe during a front-end collision or during a side-on collision of the vehicle. Namely, input of collision load to the fuel tank and the exhaust pipe during a front-end collision or during a side-on collision of the vehicle is reduced.

A vehicle floor lower structure of a second aspect of the present disclosure includes the vehicle floor lower structure of the first aspect, wherein a floor tunnel that projects out toward a vehicle body upper side and that extends along the vehicle body front-rear direction is formed at a vehicle width direction center of the floor panel, a widened section that widens toward a vehicle width direction outer side is formed at a lower end portion of the floor tunnel, at least a portion of the fuel tank is disposed inside the floor tunnel; and a portion of the exhaust pipe is disposed inside the widened section.

In the second aspect, a portion of the exhaust pipe is disposed inside the widened section formed at the lower end portion of the floor tunnel. Thus, a space inside the floor tunnel is effectively utilized compared to configurations in which there is no portion of the exhaust pipe disposed inside the widened section.

A vehicle floor lower structure of a third aspect of the present disclosure includes the vehicle floor lower structure of the second aspect, wherein at least a portion of the widened section juts out in the vehicle width direction as far as a vehicle body lower side of a front seat of the vehicle.

In the third aspect, at least a portion of the widened section juts out in the vehicle width direction as far as the vehicle body lower side of the front seat of the vehicle. Thus, the space at the vehicle body lower side of the front seat is effectively utilized compared to configurations in which there is no portion of the widened section jutting out as far as the vehicle body lower side of the front seat.

A vehicle floor lower structure of a fourth aspect of the present disclosure includes the vehicle floor lower structure of the second aspect or the third aspect, further includes a left and right pair of rockers that respectively extend along the vehicle body front-rear direction at vehicle width direction outer sides of the left and right pair of under reinforcements, and a cross member that extends along the vehicle width direction and that couples the left and right pair of rockers and the floor tunnel, wherein as viewed along the vehicle width direction, the fuel tank is disposed in a position overlapping the cross member in a vehicle body up-down direction.

In the fourth aspect, as viewed along the vehicle width direction, the fuel tank is disposed in a position overlapping the cross member, which couples between the left and right pair of rockers and the floor tunnel, in the vehicle body up-down direction. This enables the fuel tank to be efficiently supported by the rockers through the cross member, compared to configurations in which the fuel tank is not disposed in a position overlapping the cross member in the vehicle body up-down direction.

DETAILED DESCRIPTION

Detailed explanation follows regarding exemplary embodiments according to the present invention, based on the examples illustrated in the drawings. Note that for ease of explanation, in each of the drawings, the arrow UP indicates the vehicle body upper direction, the arrow FR indicates the vehicle body front direction, and the arrow LH indicates the vehicle body left direction. In the below explanation, unless specifically stated otherwise, reference to the up-down, front-rear, and left-right directions refers to up-down in the vehicle body up-down direction, front-rear in the vehicle body front-rear direction, and left-right in the vehicle body left-right direction.

First Exemplary Embodiment

As illustrated in FIGS. 1 to 6, a vehicle floor lower structure 10 according to an exemplary embodiment includes a fuel tank 20 and a battery pack 30 disposed at a vehicle body lower side of a floor panel 14 configuring a floor of a vehicle 12, and disposed between an axle of front wheels 66 and an axle of rear wheels 68 that are separated in the front-rear direction. An engine 16 is installed in a front section between the left and right front wheels 66 of the vehicle 12, and gasoline serving as fuel supplied to the engine 16 is stored in the fuel tank 20.

A traction motor (not illustrated in the drawings) used to drive the front wheels is also installed in the front section of the vehicle 12, and the battery pack 30 is a power source that drives the traction motor. Namely, the vehicle 12 is what is referred to as a hybrid vehicle that is capable of running on not only gasoline, but also electricity. The battery pack 30 is disposed in close proximity to a rear side of the fuel tank 20. In other words, the fuel tank 20 is disposed in close proximity to a front side of the battery pack 30.

Figure 6:
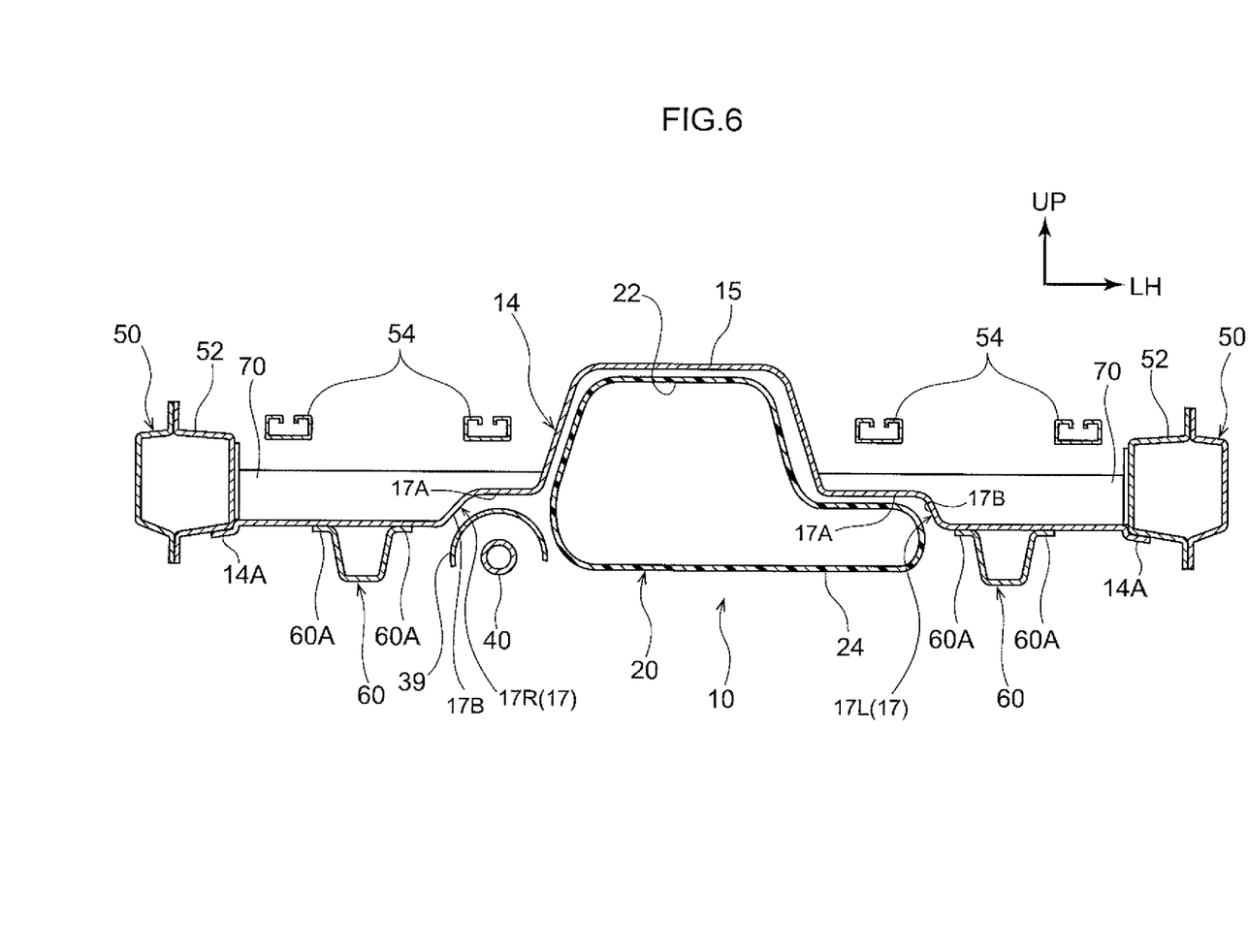
FIG. 6 is a cross-section along arrow line X-X in FIG. 4.

To explain in detail, as illustrated in FIG. 6, a tunnel section 15, serving as a floor tunnel, is formed projecting out toward an upper side and extending along a front-rear direction at a substantially vehicle width direction center portion of the floor panel 14. The tunnel section 15 is formed in a substantially isosceles trapezoidal shape in face-on cross-section view, and widened sections 17 that widen toward vehicle width direction outer sides are respectively formed in lower end portions of the tunnel section 15.

Each widened section 17 is formed of an upper wall 17A, and an inner wall 17B extending downward from a vehicle width direction outer side end portion of the upper wall 17A. At least a portion of the upper wall 17A of the widened section 17 juts out as far as a vehicle body lower side of a front seat 56, serving as a driving seat or a front passenger seat. Note that in the below explanation, the widened section 17 at the right side is sometimes referred to as widened section 17R, and the widened section 17 at the left side is sometimes referred to as widened section 17L.

Figure 1:
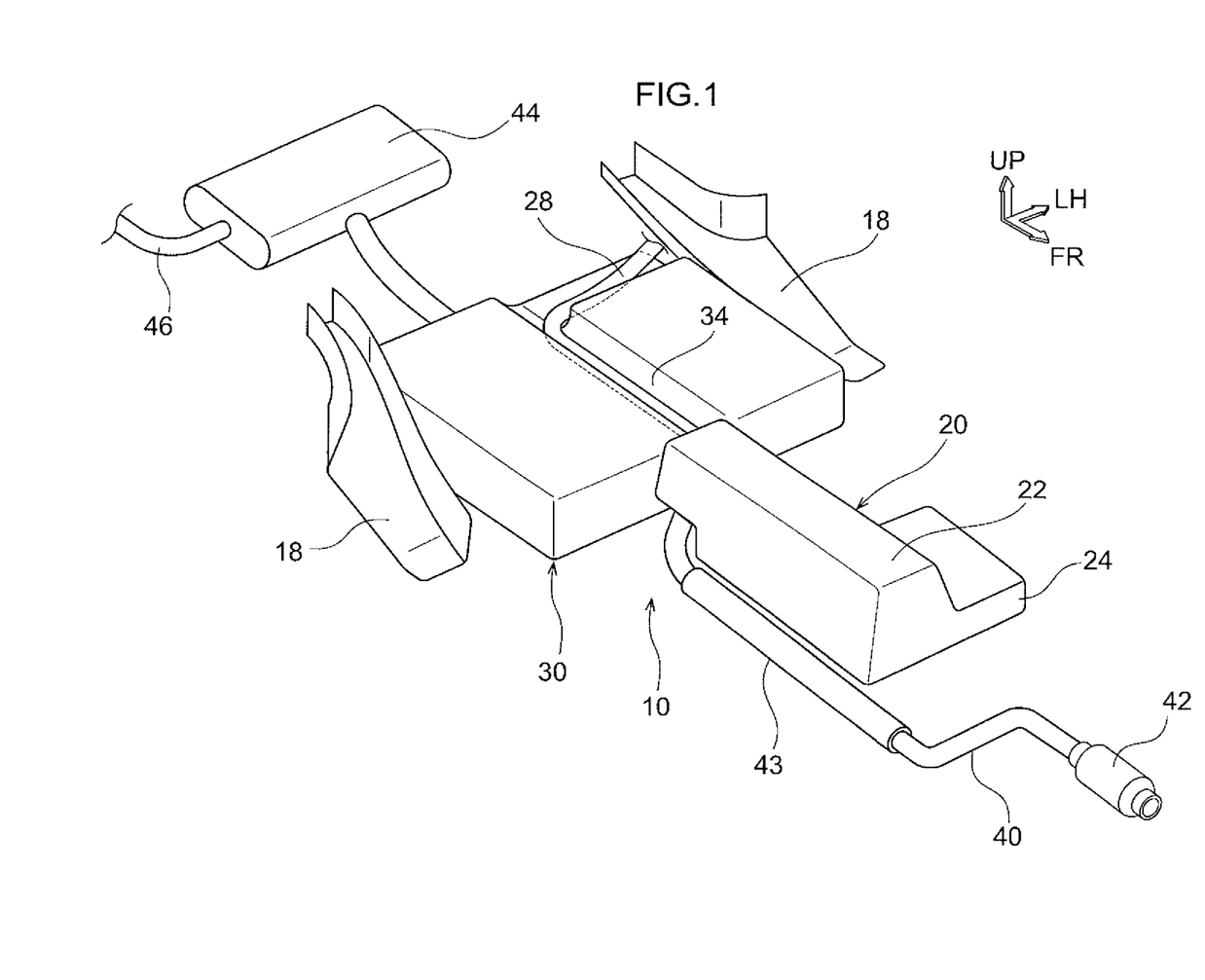
FIG. 1 is a perspective view illustrating a vehicle floor lower structure according to an exemplary embodiment as viewed diagonally from above.
Figure 2:
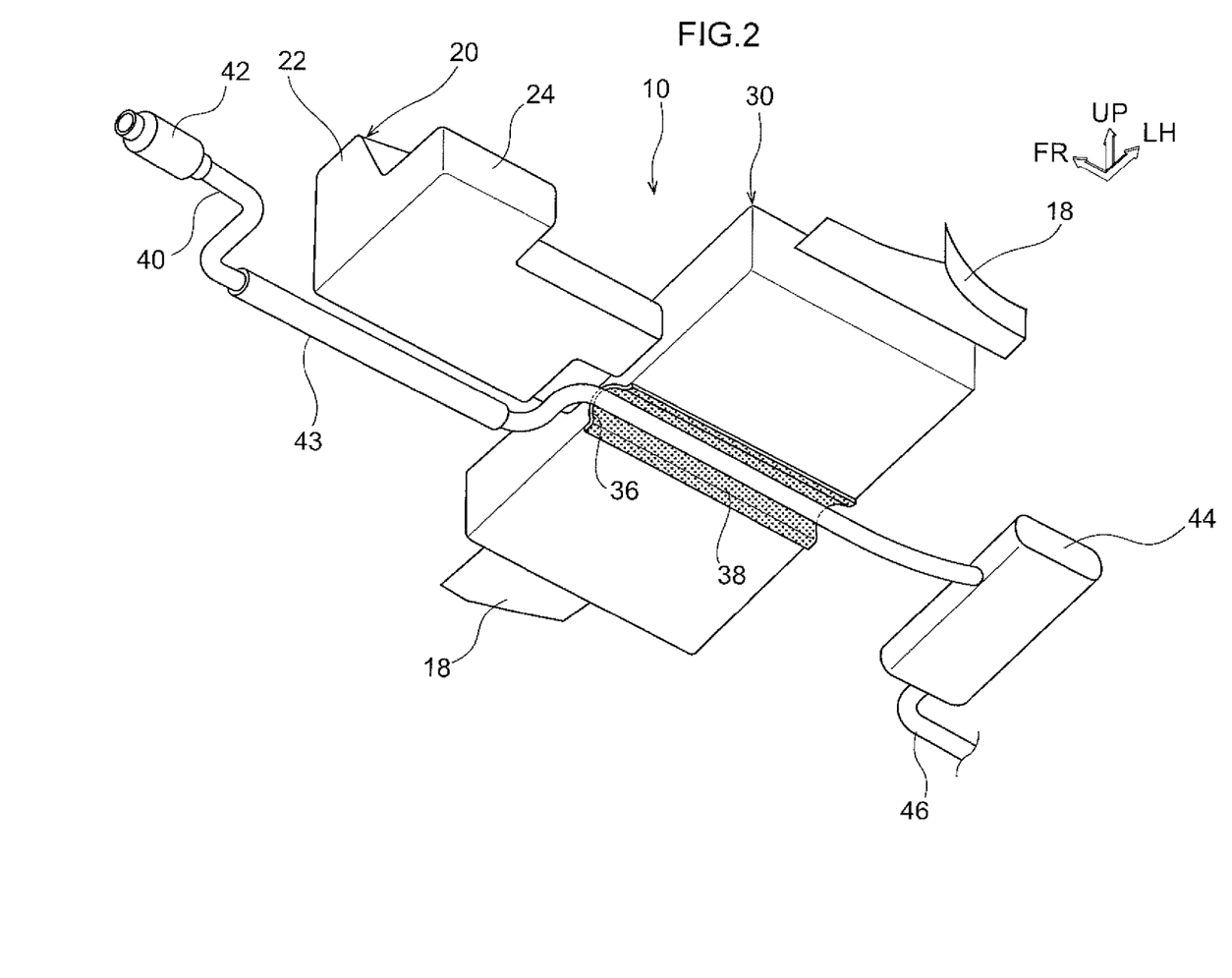
FIG. 2 is a perspective view illustrating a vehicle floor lower structure according to an exemplary embodiment as viewed diagonally from below.
Figure 3:
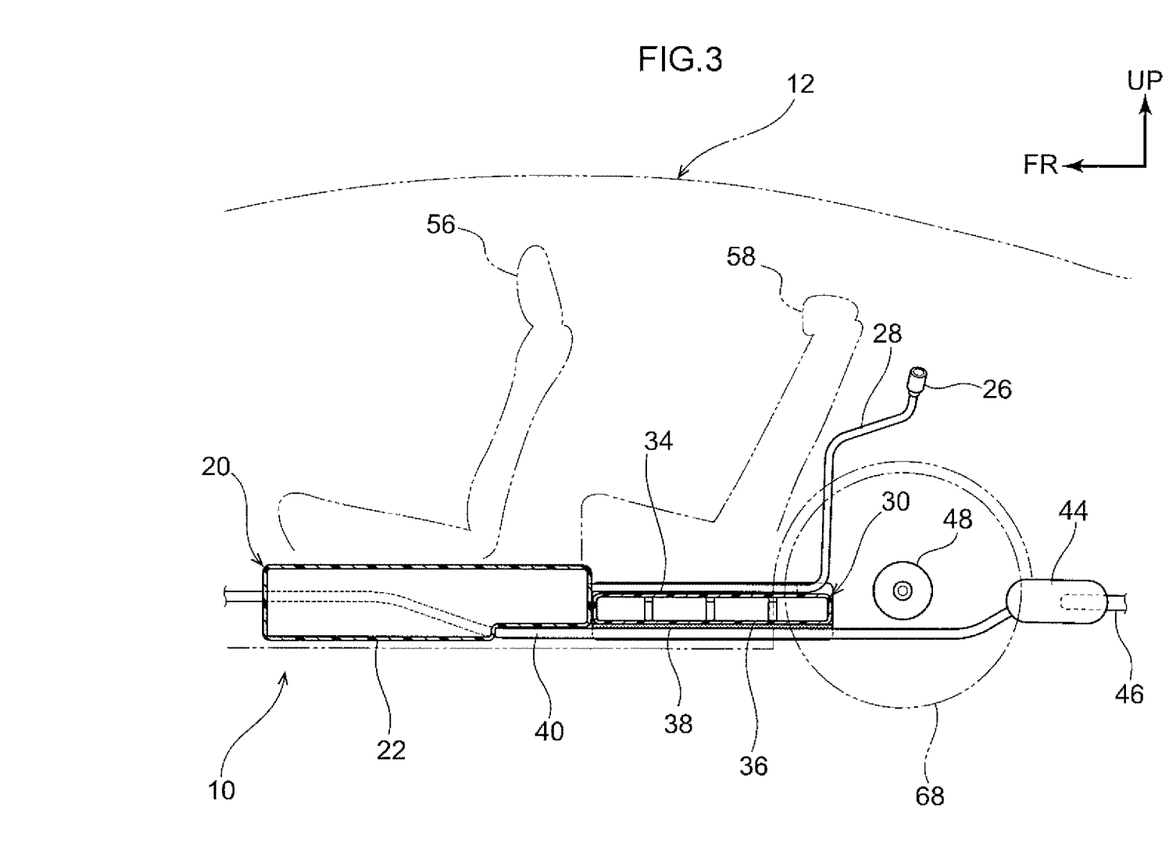
FIG. 3 is side view illustrating a partial cross-section of a vehicle including a vehicle floor lower structure according to an exemplary embodiment.
Figure 4:
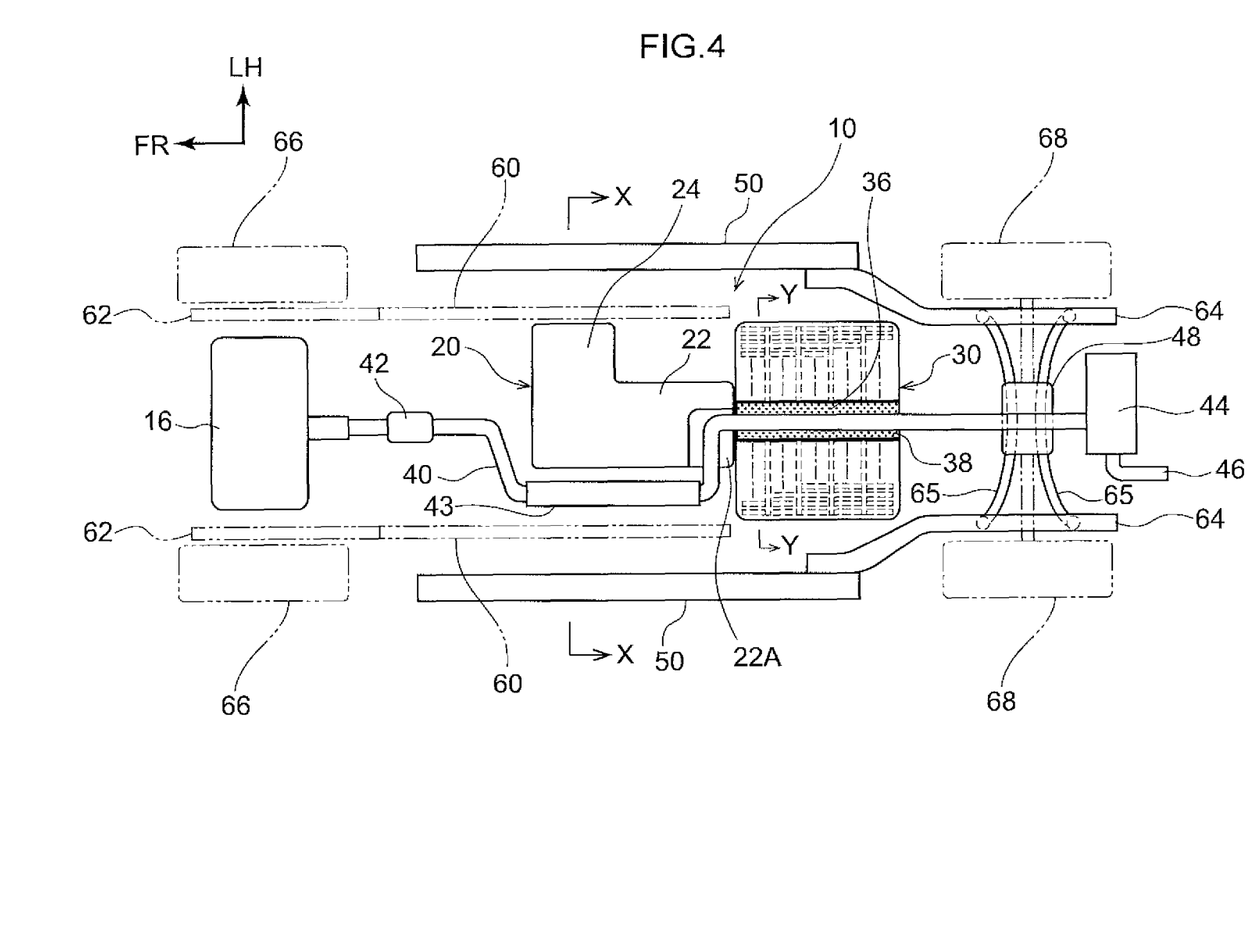
FIG. 4 is a bottom view illustrating a vehicle including a vehicle floor lower structure according to an exemplary embodiment.

As illustrated in FIGS. 1, 2, and 4, the fuel tank 20 is formed in a substantially "L" shape in plan view using a resin material. The fuel tank 20 includes a main tank section 22 disposed at a substantially vehicle width direction center portion, and a sub tank section 24 extending from a front portion of the main tank section 22 toward a left side (an outer side in the vehicle width direction).

As illustrated in FIG. 6, the main tank section 22 is formed in a substantially isosceles trapezoidal shape in face-on cross-section view, and is disposed inside the tunnel section 15. Note that a lower end portion of the main tank section 22 at the opposite side (right side) to the sub tank section 24 faces the inner wall 17B of the right side widened section 17R in the vehicle width direction.

The sub tank section 24 is formed in a substantially rectangular shape that has a smaller height than the main tank section 22 in face-on cross-section view, and is disposed inside the left side widened section 17L. The main tank section 22 and the sub tank section 24 are integrally formed, and are in communication with each other. The capacity of the fuel tank 20 is secured by the above configuration.

As illustrated in FIGS. 1 to 4, the battery pack 30 is formed in a substantially rectangular shape that is longer in the vehicle width direction than in the front-rear direction in plan view, and includes multiple battery cells 32 (see FIG. 7) inside. The battery pack 30 is disposed at a substantially vehicle width direction center portion at a vehicle body lower side of rear seats 58, and a left and right pair of rear floor members 18 are respectively disposed at vehicle width direction outer sides of the battery pack 30.

A fuel supply port 26 for supplying gasoline to the fuel tank 20 is disposed at an upper rear side of the battery pack 30. The fuel tank 20 and the fuel supply port 26 are connected to each other by an inlet pipe 28. Specifically, a front end portion (one end portion) of the inlet pipe 28 is placed in communication with a rear end portion of the extension tank section 23 of the fuel tank 20, and a rear end portion (another end portion) of the inlet pipe 28 is in communication with the fuel supply port 26.

The inlet pipe 28 is routed at an upper side of the battery pack 30. Specifically, an upper recessed portion 34 (see FIG. 7 also) is formed in a substantially semicircular arc shaped cross-section and extends along the front-rear direction at a substantially vehicle width direction center portion of an upper face of the battery pack 30. A portion of the inlet pipe 28 is routed so as to pass through the upper recessed portion 34 and extends along the front-rear direction.

An exhaust pipe 40 is routed from a substantially vehicle width direction center portion of the engine 16 toward the rear side. A catalyst 42 is placed in communication with the exhaust pipe 40 that is between the engine 16 and the fuel tank 20. Harmful substances in the exhaust gas discharged from the engine 16 into the exhaust pipe 40 are cleaned by being oxidized or reduced by the catalyst 42.

The exhaust pipe 40 that is further toward the rear side from the catalyst 42 bends toward the right side (vehicle width direction outer side), and then bends back toward the rear side. Namely, a portion of the exhaust pipe 40 passes beside the main tank section 22 at a right side of the fuel tank 20, this being the opposite side to the sub tank section 24, extending toward the rear side. This portion of the exhaust pipe 40 is disposed inside the right side widened section 17R of the tunnel section 15 (see FIG. 6).

Note that the portion of the exhaust pipe 40 that passes by at the right side of the main tank section 22 inside the widened section 17R has a two layer pipe structure, and configures a sub muffler 43. A thermal insulation member 39 with a substantially semicircular arc shaped cross-section is disposed extending along the front-rear direction between this portion of the exhaust pipe 40 and the widened section 17R of the floor panel 14.

After passing by at the right sides of the main tank section 22 and extending toward the rear side, the exhaust pipe 40 bends toward the vehicle width direction inner side (left side) at a rear portion of the main tank section 22, and then bends back toward the rear side. A recessed portion 22A with a substantially rectangular shape in bottom face view to permit passage of the exhaust pipe 40 is thereby formed at a lower face at the rear portion of the main tank section 22.

The exhaust pipe 40 is routed so as to pass by at a vehicle body lower side of the battery pack 30 and extend toward the rear side. Accordingly, the exhaust pipe 40 mainly passes through at a substantially vehicle width direction center portion of the vehicle 12 excluding a portion of the exhaust pipe 40 that passes by at the right sides of the main tank section 22 of the fuel tank 20 inside the widened section 17R.

Specifically, a lower recessed section 36 (see FIG. 7 also) with a substantially semicircular arc shaped cross-section extending along the front-rear direction is formed in a substantially vehicle width direction center portion of a lower face of the battery pack 30. A portion of the exhaust pipe 40 is disposed so as to pass through the lower recessed section 36 and extend toward the rear side. Note that a thermal insulation member 38 (see FIG. 7 also) with a substantially semicircular arc shaped cross-section extending along the front-rear direction is provided in advance inside the lower recessed section 36, and the exhaust pipe 40 is routed so as to pass by at the vehicle body lower side of the thermal insulation member 38.

After passing through the lower recessed section 36 of the battery pack 30 and extending toward the rear side, the exhaust pipe 40 is placed in communication with a main muffler 44. The main muffler 44 is formed in a substantially elliptical column shape with its axial direction along the vehicle width direction. The exhaust pipe 40 is connected to a substantially vehicle width direction center portion at a front end portion of the main muffler 44. A muffler cutter 46 extends from a side portion of the main muffler 44 toward the rear side.

Figure 5:
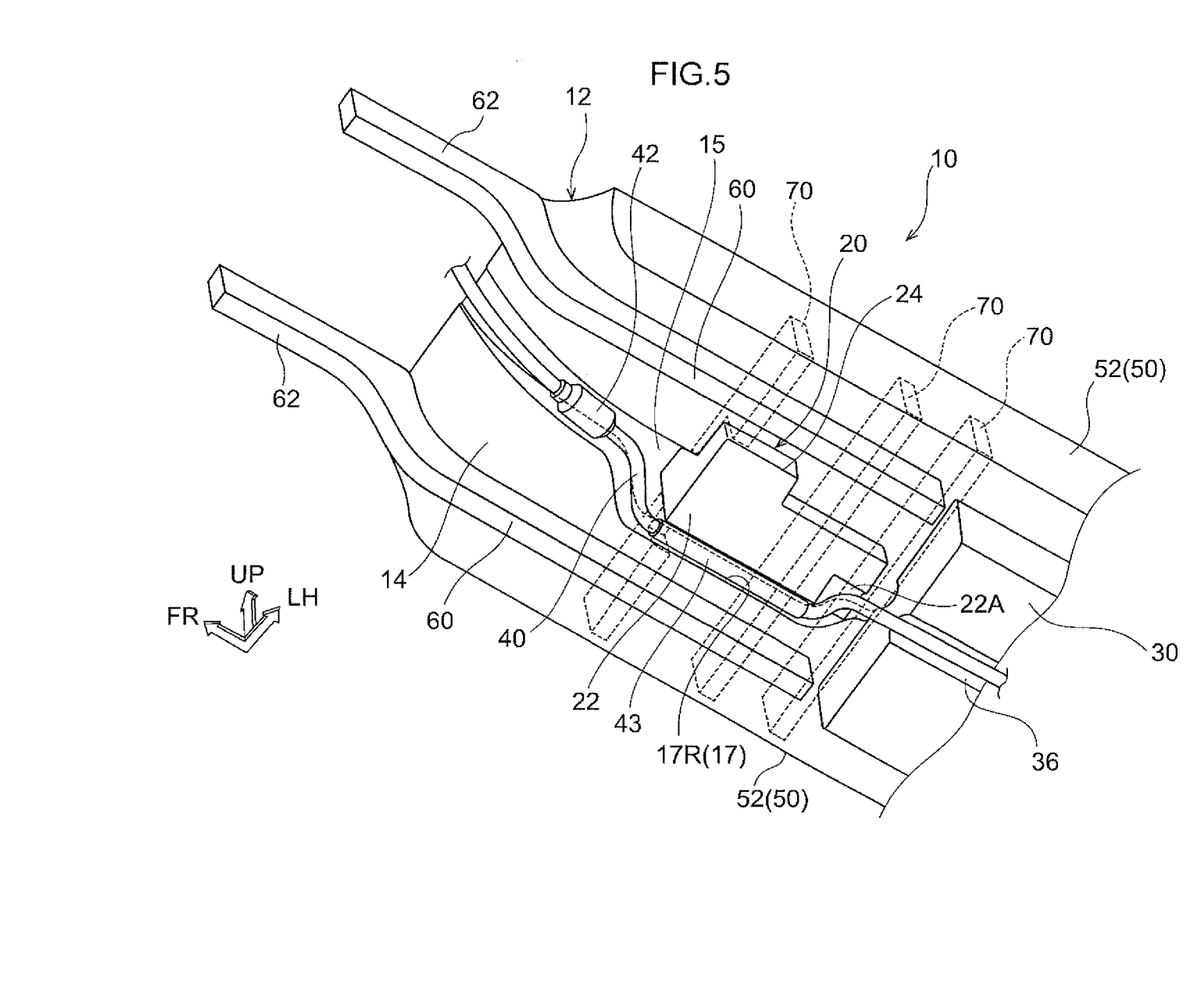
FIG. 5 is a perspective view illustrating a portion of a vehicle floor lower structure according to an exemplary embodiment as viewed diagonally from below.

As illustrated in FIG. 6, vehicle width direction outer side end portions 14A of the floor panel 14 are respectively joined to lower faces of rocker inner panels 52 of a left and right pair of rockers 50 that respectively extend along the front-rear direction at either side of the vehicle 12. As illustrated in FIGS. 4 to 6, a left and right pair of under reinforcements 60 that extend along the front-rear direction are respectively joined to lower faces of the floor panel 14 that are further toward the vehicle width direction inner sides from the rockers 50, and further toward the vehicle width direction outer sides from the fuel tank 20.

Each under reinforcement 60, serving as a vehicle body frame member, is formed with a substantially hat shaped cross-section profile. Flange portions 60A at both the left and right side of each under reinforcement 60 are joined to the lower face of the floor panel 14 by welding or the like to form a chamber profile. Note that the right side widened section 17R, through which the portion of the exhaust pipe 40 passes, is formed between the right side under reinforcement 60 and the lower end portions of the main tank section 22.

Each under reinforcement 60 is disposed at the front side of the battery pack 30 in side-on view. Front end portions of the respective under reinforcements 60 are integrally joined to rear end portions of a left and right pair of front side members 62, each extending toward the front side.

As illustrated in FIGS. 5 and 6, the left and right pair of rockers 50 and the tunnel section 15 are coupled together by cross members 70 that each extends along the vehicle width direction. Plural (three, for example) cross members 70, each with a chamber profile, are disposed in a row in the front-rear direction. Vehicle width direction outer side end portions of each cross member 70 are joined to side faces of the rocker inner panels 52, and a vehicle width direction inner side end portion of each cross member 70 is joined to a side face of the tunnel section 15.

The fuel tank 20 is disposed in a position overlapping the respective cross members 70 in the vehicle body up-down direction in face-on cross-section view viewed in the front-rear direction, and in side cross-section view viewed in the vehicle width direction. A left and right pair of seat rails 54 for mounting the respective front seats 56 (the driving seat or front passenger seat) are spanned across upper faces of the respective cross members 70 on either left and right side of the tunnel section 15. Each seat rail 54 extends along the front-rear direction and is configured such that a front-rear direction position of the respective front seat 56 is adjustable.

A traction motor 48 used to drive the rear wheels is provided at a rear side of the battery pack 30 between the left and right rear wheels 68. Namely, the vehicle 12 is configured capable of switching between front-wheel drive and four-wheel drive.

Outer walls of front end portions of a left and right pair of rear side members 64 are respectively joined to the rocker inner panels 52 at rear end portions of the respective rockers 50. Each rear side member 64 extends toward the rear side. Rear sub frames 65 that couple between the left and right rear side members 64 are respectively disposed at front and rear sides of the traction motor 48.

Explanation follows regarding operation of the vehicle floor lower structure 10 according to the exemplary embodiment configured as described above.

As described above, the fuel tank 20 is disposed at the front side of the battery pack 30. Thus, when the vehicle 12 has been in a rear-end collision, collision load is directly input to the battery pack 30 through the respective rear sub frames 65, and direct input of a collision load to the fuel tank 20 is reduced or suppressed. This enables the input of collision load toward the fuel tank 20 during a rear-end collision of the vehicle 12 to be decreased, enabling issues such as damage to the fuel tank 20 to be reduced or prevented from occurring.

The fuel tank 20 and the battery pack 30, these being heavy components, are disposed between the axis of the front wheels 66 and the axis of the rear wheels 68, and are arranged along the front-rear direction at the vehicle body lower side of the floor panel 14. This enables distribution of load at the front section side and the rear section side of the vehicle 12 to be optimized, and also enables the center of gravity of the vehicle 12 to be lowered. The maneuverability of the vehicle 12 is accordingly improved.

Note that, when the fuel tank 20 and the battery pack 30 are disposed at the vehicle body lower side of the floor panel 14, there is also an advantage in that the design of the body further toward the upper side of the floor panel 14 is not restricted as a result. In particular, when the battery pack 30 is disposed at the vehicle body lower side of the floor panel 14, there is an advantage in that luggage space inside the vehicle 12 can be increased compared to configurations in which the battery pack 30 is disposed at the rear side of the rear seats 58.

The fuel tank 20 is formed such that the main tank section 22 is disposed inside the tunnel section 15 and can be made tall in height, thereby enabling the vehicle width direction length of the fuel tank 20 including the sub tank section 24 to be shortened, while suppressing a reduction in the capacity of the fuel tank 20. This enables the under reinforcements 60, each serving as a vehicle body frame member extending along the front-rear direction, to be disposed at the vehicle width direction outer sides of the fuel tank 20, and the exhaust pipe 40.

This enables the fuel tank 20 and the exhaust pipe 40 to be protected, not only during a rear-end collision of the vehicle 12, but also during a front-end collision or during a side-on collision of the vehicle 12. Namely, the input of collision load to the fuel tank 20 and the exhaust pipe 40 during a front-end collision or during a side-on collision of the vehicle 12 can be reduced or suppressed by the under reinforcements 60 thereby reducing or preventing issues such as damage to the fuel tank 20 and the exhaust pipe 40 from occurring.

The fuel tank 20 is disposed in a position overlapping the cross members 70, which respectively couple between the left and right pair of rockers 50 and the tunnel section 15, in the vehicle body up-down direction. This enables the fuel tank 20 (inertia mass) to be efficiently supported by the rockers 50 through the cross members 70, compared to configurations in which the fuel tank 20 is not disposed in a position overlapping the cross members 70 in the vehicle body up-down direction.

A portion of the exhaust pipe 40 is disposed inside the widened section 17 formed at the lower end portion of the tunnel section 15, specifically, inside the widened section 17R at the right side. This enables the space inside the tunnel section 15 to be effectively utilized, compared to configurations in which no portion of the exhaust pipe 40 is disposed inside the widened section 17.

A least a portion of each widened section 17 (a portion of the upper wall 17A) juts out as far as the vehicle body lower side of the respective front seats 56. This enables the space at the vehicle body lower side of each front seat 56 to be effectively utilized, compared to configurations in which no portion of the widened section 17 (no portion of the upper wall 17A) juts out as far as the vehicle body lower side of the respective front seat 56.

The vehicle 12 including the vehicle floor lower structure 10 according to the present exemplary embodiment enables the traction motor 48 used to drive the rear wheels to be disposed at the rear side of the battery pack 30. This enables product appeal to be increased compared to hybrid vehicles which are only disposed with a traction motor used for front-wheel drive and which are not capable of switching between front-wheel drive and four-wheel drive.

The inlet pipe 28 is routed at the upper side of the battery pack 30, thereby enabling the inlet pipe 28 to be protected by the battery pack 30. Namely, this enables the impact from a flying stone or the like while the vehicle 12 is travelling to be reduced or prevented from being imparted to the inlet pipe 28. The upper recessed portion 34 in which a portion of the inlet pipe 28 is disposed is formed at the upper face of the battery pack 30, thereby also enabling the inlet pipe 28 to be protected by the battery pack 30 during a collision of the vehicle 12.

The exhaust pipe 40 is routed at the vehicle body lower side of the battery pack 30 and the inlet pipe 28 is disposed at the opposite side of the battery pack 30 to the exhaust pipe 40, thereby enabling the inlet pipe 28 to be disposed at a distance from the exhaust pipe 40. This enables heat damage to the inlet pipe 28 by the exhaust pipe 40 to be reduced.

The lower recessed section 36 in which a portion of the exhaust pipe 40 is disposed is formed at the lower face of the battery pack 30, thereby enabling space to install the exhaust pipe 40 to be secured, even if the vehicle 12 has a low height. The thermal insulation member 38 is disposed between the battery pack 30 and the exhaust pipe 40, thereby also enabling heat damage to the battery pack 30 by the exhaust pipe 40 to be reduced.

Figure 7:
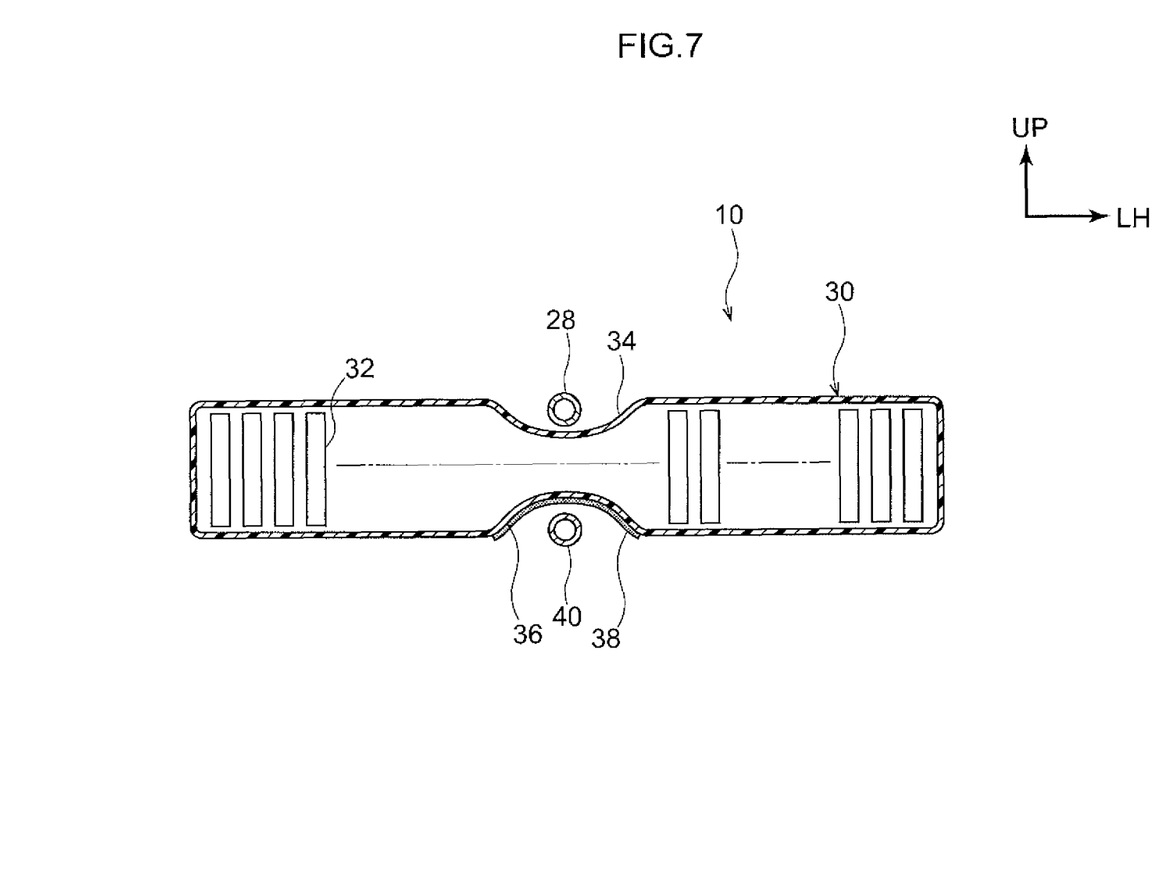
FIG. 7 is a cross-section along arrow line Y-Y in FIG. 4.
Figure 8:
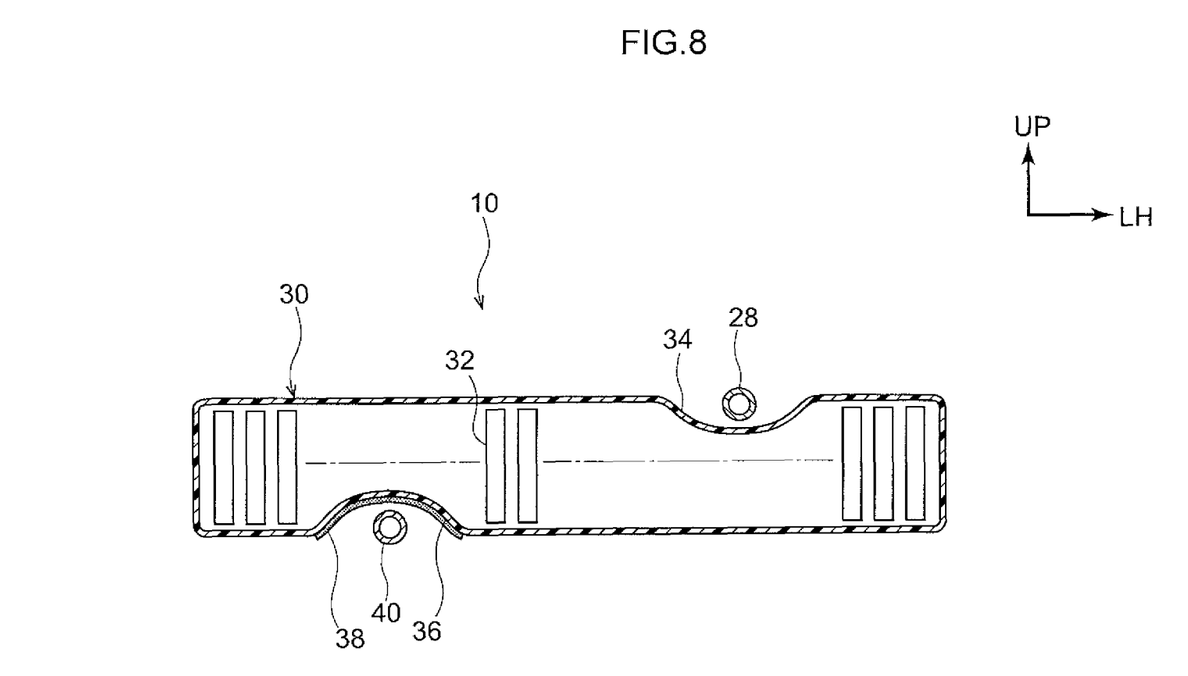
FIG. 8 is a cross-section corresponding to FIG. 7, illustrating a modified example of a battery pack configuring a vehicle floor lower structure according to an exemplary embodiment.

As illustrated in FIG. 7, the upper recessed portion 34 and the lower recessed section 36 are both formed at the vehicle width direction substantially center portions that are the same positions as each other in plan view and face-on view, such that the thickness of the substantially vehicle width direction center portion of the battery pack 30 is locally thinner. As illustrated in FIG. 8, the upper recessed portion 34 and lower recessed section 36 of the battery pack 130 may be formed separated from each other in the vehicle width direction in plan view and face-on view.

The upper recessed portion 34 and the lower recessed section 36 are not formed in the same upper and lower positions, thereby enabling a portion with a locally thin thickness to be prevented from occurring in the battery pack 130, enabling a substantially uniform thickness to be secured. The rigidity of the battery pack 130 can accordingly be made higher than in the first exemplary embodiment as shown in FIG. 7. This enables the number of battery cells 32 to be increased compared to the first exemplary embodiment, thereby enabling a driving range with the traction motor to be extended.

The vehicle floor lower structure 10 according to the present exemplary embodiment has been explained above based on the drawings; however, the vehicle floor lower structure 10 according to the present exemplary embodiment is not limited to that illustrated in the drawings, and obviously design modifications may be implemented as appropriate within a range not departing from the scope of the present claims. For example, a configuration may be applied in which neither the upper recessed portion 34 nor the lower recessed section 36 are formed in the upper face and lower face of the battery pack 30.

As long as the configuration is such that heat damage to the battery pack 30 from the exhaust pipe 40 is reduced, a configuration may be applied in which the thermal insulation member 38 is not provided inside the lower recessed section 36. The exhaust pipe 40 is not limited to a configuration that is routed bending as described above, and the exhaust pipe 40 may be configured routed curving in a circular arc shape in plan view, for example. In the drawings, the height of the battery pack 30 is higher than the height of the sub tank section 24, but is lower than the height of the main tank section 22; however, there is no limitation thereto.

It is sufficient as long as a portion of the exhaust pipe 40 is disposed inside the tunnel section 15, and configuration may be such that the widened section 17R through which a portion of the exhaust pipe 40 passes is not formed at the lower end portion of the tunnel section 15. The widened section 17 is not limited to a configuration jutting out as far as the vehicle body lower side of the respective front seats 56.

What is claimed is:

1. A vehicle floor lower structure comprising:
a floor panel that configures a floor of a vehicle, the floor panel including a floor tunnel at a vehicle width direction center of the floor panel, the floor tunnel projecting outward toward a vehicle body upper side and extending along a vehicle body front-rear direction, the floor tunnel including a widened section at a lower end portion of the floor tunnel, the widened section widening towards a vehicle width direction outer side, the widened section including an upper wall and an inner wall, the inner wall extending downward from a vehicle width direction outer side end portion of the upper wall;

a fuel tank that is disposed at a vehicle body lower side of the floor panel, at least a portion of the fuel tank being disposed inside the floor tunnel;

an exhaust pipe that extends from an engine toward a vehicle body rear side, the exhaust pipe passing at a vehicle width direction outer side of the fuel tank, a portion of the exhaust pipe being disposed inside the widened section of the floor tunnel; and a left under reinforcement and a right under reinforcement that are joined to a lower face of the floor panel, the left under reinforcement and the right under reinforcement respectively extending along a vehicle body front-rear direction at vehicle width direction outer sides of the fuel tank and the exhaust pipe.

2. The vehicle floor lower structure of claim 1, wherein at least a portion of the widened section is configured to jut out in the vehicle width direction as far as a vehicle body lower side of a front seat of the vehicle.

3. The vehicle floor lower structure of claim 1, further comprising:

a left rocker and a right rocker that respectively extend along the vehicle body front-rear direction at vehicle width direction outer sides of the left under reinforcement and the right under reinforcement; and a cross member that extends along the vehicle width direction, the cross member coupling the left and the right pair of rockers and the floor tunnel, wherein as viewed along the vehicle width direction, the fuel tank is disposed in a position overlapping the cross member in a vehicle body up-down direction.

4. The vehicle floor lower structure of claim 1, wherein:

the widened section is respectively disposed at both sides in the vehicle width direction of the floor tunnel;

the portion of the exhaust pipe is disposed at one of the widened sections; and the portion of the fuel tank is disposed at the other widened section.

* * * * *